United States Patent
Chiba

(10) Patent No.: US 10,368,338 B2
(45) Date of Patent: Jul. 30, 2019

(54) WIRELESS DEVICE, NETWORK SYSTEM AND CONTROL METHOD OF WIRELESS DEVICE

(71) Applicant: BUFFALO INC., Nagoya-shi (JP)

(72) Inventor: Hayato Chiba, Nagoya (JP)

(73) Assignee: BUFFALO INC., Nagoya-shi (JP)

(*) Notice: Subject to any disclaimer, the term of this patent is extended or adjusted under 35 U.S.C. 154(b) by 169 days.

(21) Appl. No.: 14/743,597

(22) Filed: Jun. 18, 2015

(65) Prior Publication Data

US 2015/0373553 A1 Dec. 24, 2015

(30) Foreign Application Priority Data

Jun. 20, 2014 (JP) ................................ 2014-126925
May 21, 2015 (JP) ................................ 2015-103667

(51) Int. Cl.
*H04W 72/02* (2009.01)
*H04W 4/38* (2018.01)
*H04W 84/18* (2009.01)

(52) U.S. Cl.
CPC ............. *H04W 72/02* (2013.01); *H04W 4/38* (2018.02); *H04W 84/18* (2013.01)

(58) Field of Classification Search
None
See application file for complete search history.

(56) References Cited

U.S. PATENT DOCUMENTS

| 7,119,675 | B2 * | 10/2006 | Khandelwal | G08B 27/005 340/3.43 |
| 2004/0246906 | A1 * | 12/2004 | Hardy | G06N 5/04 370/252 |
| 2005/0207420 | A1 * | 9/2005 | Shanklin | H04L 12/56 370/392 |
| 2005/0254472 | A1 * | 11/2005 | Roh | H04L 45/00 370/338 |
| 2007/0002736 | A1 * | 1/2007 | Gade | H04L 63/1408 370/230 |

(Continued)

FOREIGN PATENT DOCUMENTS

| JP | 2007-156756 A | 6/2007 |
| JP | 2010-134636 A | 6/2010 |

(Continued)

OTHER PUBLICATIONS

Notification of Reasons for Refusal dated Nov. 27. 2018 in corr. Japanese Patent Application No. 2015-103667 (machine-generated English translation only) 3 pp.

(Continued)

*Primary Examiner* — Huy D Vu
*Assistant Examiner* — Bao G Nguyen
(74) *Attorney, Agent, or Firm* — Oblon, McClelland, Maier & Neustadt, L.L.P.

(57) ABSTRACT

There is provided a wireless device that includes circuitry configured to receive information from one or more devices connected with the wireless device, select specific information out of the information received from the one or more devices, generate shared information using the specific information as selected by the circuitry, and send the shared information to the one or more other wireless devices by direct wireless communication.

16 Claims, 9 Drawing Sheets

(56) References Cited

U.S. PATENT DOCUMENTS

| | | | | |
|---|---|---|---|---|
| 2007/0061844 A1* | 3/2007 | Hakusui | .................. | H04N 7/16 |
| | | | | 725/62 |
| 2008/0291849 A1* | 11/2008 | Ostermeier | ............ | H04W 4/90 |
| | | | | 370/270 |
| 2009/0052366 A1* | 2/2009 | Doi | ......................... | H04L 45/20 |
| | | | | 370/315 |
| 2009/0316671 A1* | 12/2009 | Rolf | ....................... | H04W 4/02 |
| | | | | 370/338 |
| 2010/0182982 A1* | 7/2010 | Yim | ................. | H04W 72/1242 |
| | | | | 370/338 |
| 2014/0071967 A1* | 3/2014 | Velasco | .............. | H04L 12/1403 |
| | | | | 370/338 |

FOREIGN PATENT DOCUMENTS

| | | |
|---|---|---|
| JP | 2012-164256 A | 8/2012 |
| JP | 2012-235282 A | 11/2012 |
| JP | 2013-046277 A | 3/2013 |
| JP | 2013-097492 A | 5/2013 |
| JP | 2013-168761 A | 8/2013 |
| JP | 2013-200727 A | 10/2013 |

OTHER PUBLICATIONS

Notification of Reasons for Refusal issued in corresponding Japanese Application No. 2015-103667 dated May 7, 2019.

* cited by examiner

| INFORMATION SOURCE | NUMBER OF HOPS | INFORMATION SUBJECTED TO SHARING |
|---|---|---|
| FIRE SENSOR | 2 | USED |
| SECURITY SENSOR | 1 | USED |
| RAIN SENSOR | 2 | USED |
| EARTHQUAKE SENSOR | 10 | USED |
| AIR CONDITIONER | — | NOT USED |
| ELECTRIC ENERGY SENSOR | — | NOT USED |

| DESTINATION MAC ADDRESS |
|---|
| AP41 |
| AP42 |
| AP43 |

| COVERAGE DISTANCE L(m) | NUMBER OF HOPS |
|---|---|
| 0<L≦200 | 1 |
| 200<L≦500 | 2 |
| 500<L≦1000 | 10 |

| TYPE | |
|---|---|
| GPS INFO | LATITUDE, LONGITUDE |
| ADDRESS | Akamon Build. Ohsu 3-chome, 30-20, Naka-ku, Nagoya, Aichi |

| INFORMATION SOURCE | COVERAGE AREA (ADDRESS) |
|---|---|
| FIRE SENSOR | Ohsu, Naka-ku, Nagoya, Aichi |
| SECURITY SENSOR | Ohsu, Naka-ku, Nagoya, Aichi |
| RAIN SENSOR | Ohsu 3-chome, Naka-ku, Nagoya, Aichi |
| EARTHQUAKE SENSOR | Naka-ku, Nagoya, Aichi |

Fig.11

| MAC ADDRESS | RSSI(dB) | NUMBER OF HOPS | | |
|---|---|---|---|---|
| | | FIRE SENSOR | SECURITY SENSOR | RAIN SENSOR |
| AP41 | −30 | 5 | 3 | 1 |
| AP42 | −50 | 8 | 5 | 2 |
| AP43 | −60 | 8 | 5 | 2 |

224E

WIRELESS DEVICE, NETWORK SYSTEM AND CONTROL METHOD OF WIRELESS DEVICE

CROSS-REFERENCE TO RELATED APPLICATIONS

The present application claims priority from Japanese Patent Applications No. 2014-126925 filed on Jun. 20, 2014 and No. 2015-103667 filed on May 21, 2015, the entirety of disclosures of which are hereby incorporated by reference into this application.

BACKGROUND

The present disclosure relates to wireless connection technology.

A home energy management system (HEMS) that manages the home energy in cooperation with HAN (home area network) is recent technology. A proposed technique shares information obtained in the HEMS systems of the respective homes (hereinafter referred to as "HEMS information") among a plurality of HEMS systems. This technique sends and receives the HEMS information to be shared via an external network infrastructure, such as a network infrastructure provided by a power company.

It may be, however, impossible to share information among HEMS systems by the prior art in a location having difficulty in providing a network infrastructure, for example, an underpopulated intermountain region. There is accordingly a need for a technique that enables information to be shared between the HEMS systems without depending on any external network infrastructure. This problem is not limited to the HEMS system but is commonly found in various energy management systems including MEMS, BEMS and FEMS and in sharing information between systems that control devices by using a LAN, a PAN (personal area network) or the like.

SUMMARY

In order to solve at least part of the problems described above, the present disclosure may be implemented by aspects described below.

According to a first aspect, there is provided a wireless device includes circuitry configured to receive information from one or more devices connected with the wireless device, select specific information out of the information received from the one or more devices, generate shared information using the specific information as selected by the circuitry, and send the shared information to the one or more other wireless devices by direct wireless communication.

The wireless device of this aspect is enabled to send the shared information to another specified wireless device by direct wireless communication and thereby allows for transmission of the shared information without depending on any external network infrastructure.

All the plurality of components included in the aspect of the disclosure described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the disclosure described above may be combined with part or all of the technical features included in another aspect of the disclosure described above to provide still another independent aspect of the disclosure.

Part or all of the configuration of the disclosure may be implemented by hardware. The hardware may be, for example, an integrated circuit, a discrete circuit or a module provided by combining these circuits.

The disclosure may be implemented by various aspects other than that described above. For example, the disclosure may be implemented by a computer program configured to implement any part or the entirety of the method of controlling the wireless connection device or a non-transitory recording medium in which such a computer program is recorded.

BRIEF DESCRIPTION OF DRAWINGS

FIG. 8 is a diagram illustrating one example of a conversion table;

FIG. 9 is a diagram illustrating one example of location information according to a third embodiment;

FIG. 10 is a diagram illustrating one example of a coverage area table according to the third embodiment; and FIG. 11 is a diagram illustrating one example of a coverage area table according to a fourth embodiment.

DESCRIPTION OF EMBODIMENTS

A. Embodiment

A-1. General Configuration of System

Figure 1:
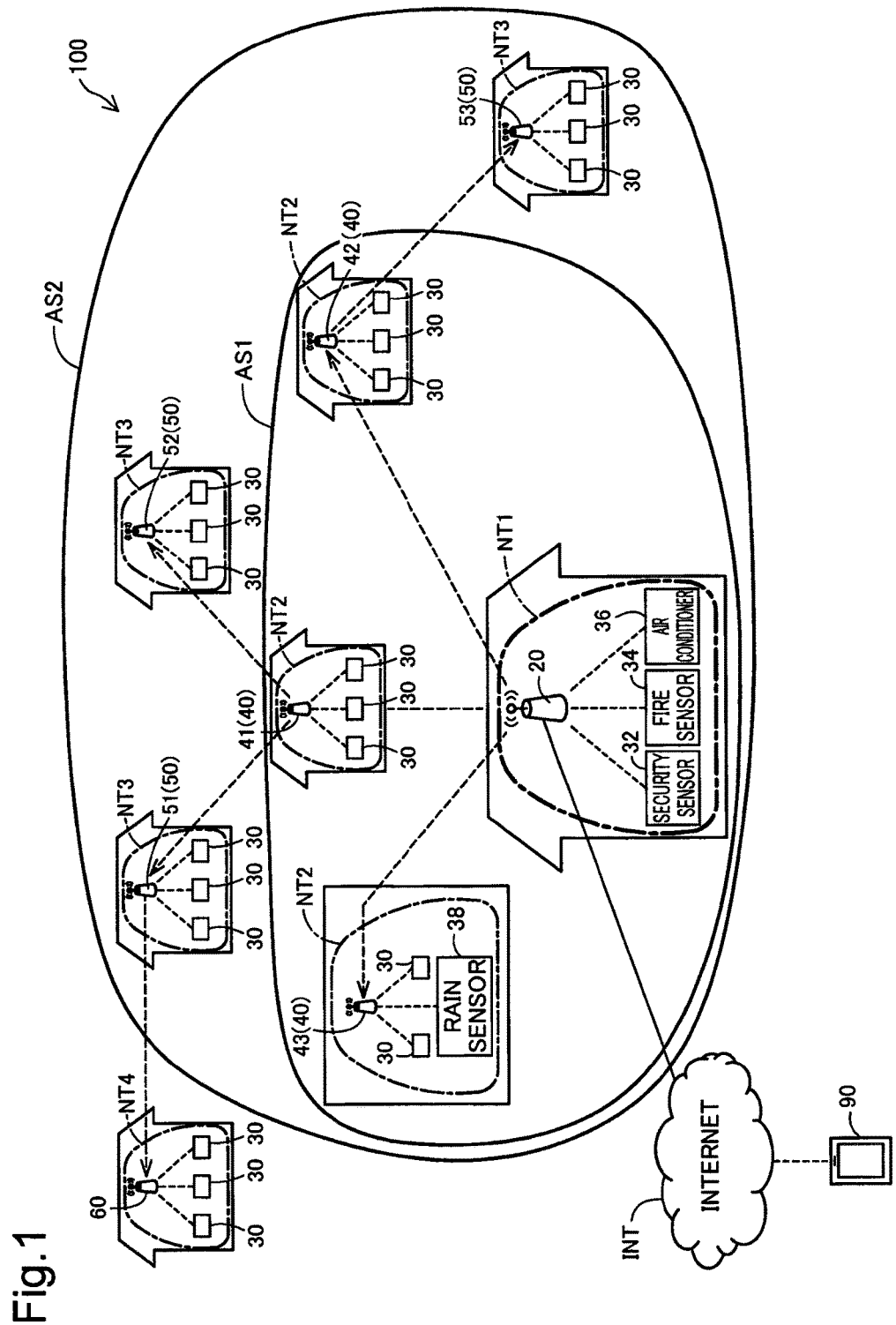
FIG. 1 is a diagram illustrating the general configuration of a network system according to one embodiment of the disclosure.

FIG. 1 is a diagram illustrating the general configuration of a network system 100 according to one embodiment of the disclosure. The network system 100 includes a first communication network NT1 as a first local area network (hereinafter referred to as "LAN"), a plurality of second communication networks NT2 as second LANs, a plurality of third communication networks NT3 and a fourth communication network NT4. The respective communication networks NT1 to NT4 included in the network system 100 are LANs created at home (including condominium as well as house) and are used for an energy management system (such as HEMS (home energy management system) or MEMS (mansion energy management system)). Each communication network is not limited to the LAN created in the house or in the condominium building, but may be a LAN created in any of various units such as an office building, a factory or a university. Each communication network may also be a LAN that is not used for the energy management system.

Access points 20, 41, 42, 43, 51, 52, 53 and 60 as wireless communication devices included in the respective communication networks NT1 to NT4 are respectively provided as access points having mesh network functions that allow for direct wireless communication between access points as described later. In FIG. 1, wireless connections (for example, connection between the access point 20 and the access point 42) are shown by broken lines, and wired connections (for example, connection between the Internet INT and the access point 20) are shown by solid lines. In the description of the embodiment, wireless connection between devices without involving any other communication network or any other device is called "direct wireless connection", and communication by direct wireless connection is called "direct wireless communication". Devices that allow for direct wireless connection are respectively placed in the coverage areas of the respective radio waves. In FIG. 1, the access points that allow for direct wireless connection with the access point 20 are the access points 41, 42 and 43, and the LANs respectively including these access points 41, 42 and 43 are provided as the second communication networks NT2. The access points that allow for direct wireless connection with the access point 41 are the access points 51 and 52, and the access point that allows for direct wireless connection with the access point 42 is the access point 53. The LANs respectively including these access points 51, 52 and 53 are provided as the third communication network NT3. The access point that allows for direct wireless connection with the access point 51 is the access point 60, and the LAN including the access point 60 is provided as the fourth communication network NT4. In other words, the LAN that allows for direct wireless connection with the first communication network NT1 is the second communication network NT2. The LAN that allows for direct wireless connection with the second communication network NT2 is the third communication network NT3. The LAN that allows for direct wireless connection with the third communication network NT3 is the fourth communication network NT4. In the description below, when there is no necessity to distinguish the access points 41, 42 and 43 from one another, these access points 41, 42 and 43 are collectively referred to as the access point 40. When there is no necessity to distinguish the access points 51, 52 and 53 from one another, these access points 51, 52 and 53 are collectively referred to as the access point 50. The respective access points shown in FIG. 1 all have the processing capabilities for sending, receiving and relaying information. For convenience of explanation, however, the following description is on the assumption that the access point 20 sends information, and the access points 40, 50 and 60 receive and relay information. More specifically, the access point 20 sends information. The access point 40 relays the received information to the access point 50. The access point 50 further relays the relayed information to the access point 60. The access point 60 eventually receives the information. In this manner, information is transferred from the access point 20 by direct wireless communication between the access points.

The first communication network NT1 mainly includes the access point 20 as the wireless connection device, a security sensor 32, a fire sensor 34 and an air conditioner 36. The first communication network NT1 may include various devices with communication functions, for example, computers, lighting devices, other household electrical appliances including TV sets and electric ovens, power generation systems such as solar power generation system, power accumulators and other sensors. In the description below, when there is no necessity to distinguish the security sensor 32, the fire sensor 34 and the air conditioner 36 from one another, the security sensor 32, the fire sensor 34 and the air conditioner 36 are collectively referred to as devices 30. The access point 20 and the devices 30 perform data communication by wireless communication in this embodiment but may alternatively perform data communication by wired communication.

Like the first communication network NT1, the second communication network NT2 includes the access point 40 as the wireless connection device and a plurality of devices 30. Similarly the third communication network NT3 includes the access point 50 and a plurality of devices 30. The fourth communication network NT4 includes the access point 60 and a plurality of devices 30. Among the plurality of second communication networks NT2, the second communication network NT2 including the access point 43 is a network in a condominium building and has a rain sensor 38 configured to detect rainfall.

The access point 20 has the mesh network functions. More specifically, the access point 20 is configured to connect with the access point 40 by a WDS (wireless distribution system) connection according to IEEE 802.11. As long as the access point 20 is configured to allow for direct wireless connection with the access point 40 without involving any other device, the communication range, the communication system and the communication standard of the access point 20 are not limited to those of this embodiment. For example, the access point 20 may be connected as a station in infrastructure mode with the access point 40 or may be connected in ad hoc mode with the access point 40. The connection may also be a wireless LAN (local area network) connection according to IEEE 802.11, a wireless PAN (private area network) connection by near field communication or according to IEEE 802.15, a wireless MAN (metropolitan area network) connection according to IEEE 802.16 or IEEE 802.20 or a wireless WAN (wide area network) connection according to 3GPP or 3GPP2. The connection may be a direct wireless connection between adjacent devices in the mesh connection mode according to, for example, IEEE 802.11s.

The access point 20 has an SSID for communicating with the devices 30 belonging to its own LAN (first communication network NT1). Additionally, the access point 20 has an information sharing unique SSID (for example, HEMS SHARE) for communicating with the access point 40 in the second communication network NT2 when information regarding the devices 30 belonging to its own LAN (hereinafter referred to as "device information") is shared in the network system 100.

Like the access point 20, the access points 40, 50 and 60 respectively have the mesh network functions and have information sharing unique SSIDs that are identical with the information sharing unique SSID of the access point 20. When the administrator of each communication network (for example, a family member in the home or a condominium manager) makes information shearing settings to share specific information relating to its own LAN in the network system 100, a common information sharing unique SSID is set. The device information is shared in the network system 100 by using the information sharing unique SSID. This configuration limits sharing of device information to between access points having the information sharing settings (i.e., specified access points).

A-2. General Configuration of Access Point

Figure 2:
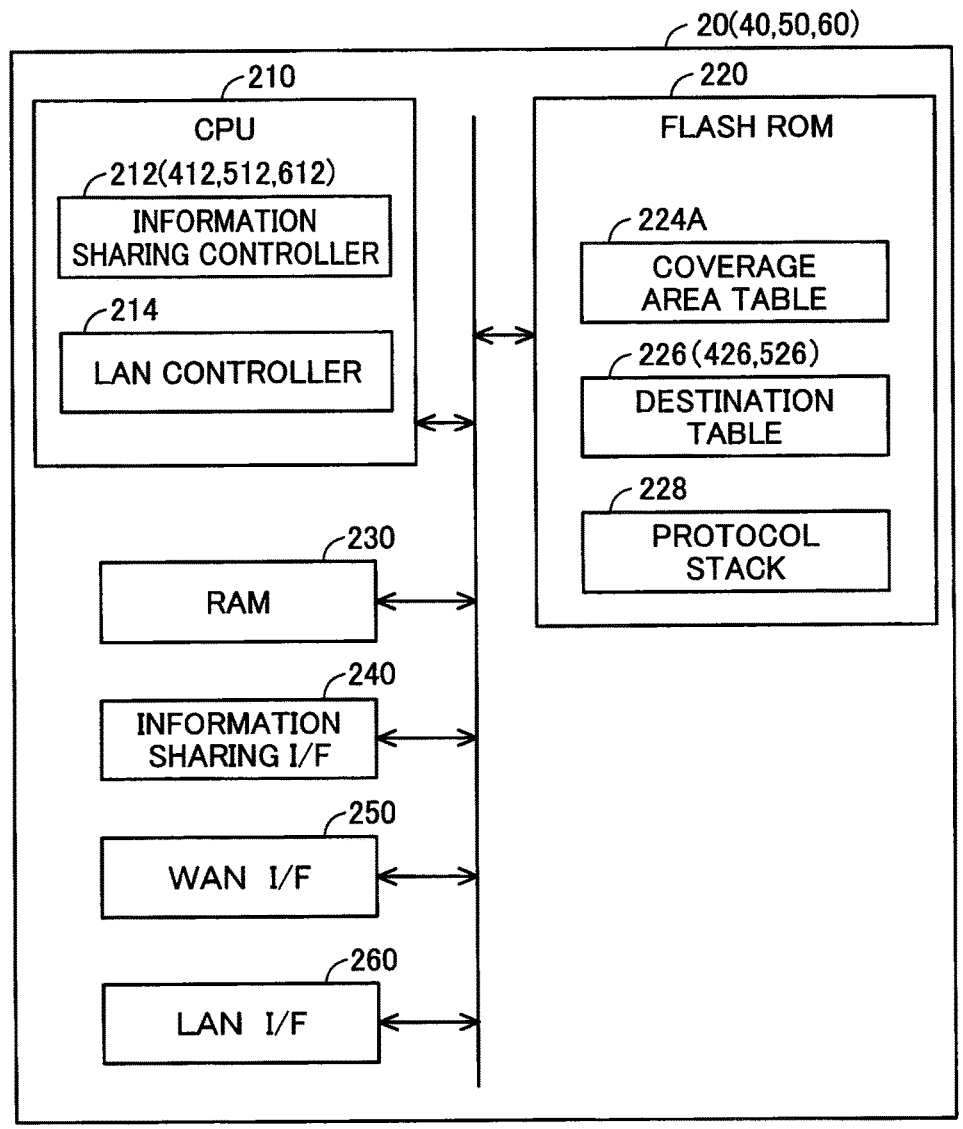
FIG. 2 is a block diagram illustrating the functional configuration of an access point.

FIG. 2 is a block diagram illustrating the functional configuration of the access point 20. The access point 20 mainly includes a CPU 210, a RAM 230, an information sharing interface (I/F) 240, a WAN interface (I/F) 250, a LAN interface (I/F) 260, and a flash ROM 220. These components are interconnected by a bus to be communicable with each other.

The information sharing interface 240 is provided as an interface for connecting with the access point 40 included in the second communication network NT2 by a WDS (wireless distribution system) connection according to IEEE 802.11. The information sharing interface 240 includes an antenna (not shown) and a control circuit (not shown). The control circuit is involved in demodulation of radio waves received via the antenna and data generation, as well as generation and modulation of radio waves to be sent via the antenna.

The WAN interface 250 is provided as an interface for connecting with a line on the Internet INT side (shown in FIG. 1). The WAN interface 250 includes a PHY/MAC controller that shapes the waveform of received signals and takes out MAC frames from received signals.

The LAN interface 260 compatible with multi-ESSID function is configured to be communicable with a plurality of devices 30 in the first communication network NT1 and has a plurality of wireless communication interfaces of different standards. According to this embodiment, the plurality of wireless communication interfaces are respectively in conformity with IEEE 802.11, Z-Wave (registered trademark) and ZigBee (registered trademark). Each of the plurality of wireless communication interfaces includes an antenna (not shown) and a control circuit (not shown). The control circuit of each wireless communication interface is involved in demodulation of radio waves received via the antenna and data generation, as well as generation and modulation of radio waves to be sent via the antenna, according to its conforming standard. The wireless communication interfaces of the LAN interface 260 are not limited to those of this embodiment but may be wireless communication interfaces in conformity with other standards. The LAN interface 260 may include a wireless communication interface in conformity with another standard or a wired communication interface, in addition to those described above. The LAN interface 260 may have only one wireless communication interface or may have only one wired communication interface.

The CPU 210 loads and executes a program stored in the flash ROM 220 on the RAM 230, so as to control the access point 20. The CPU 210 also implements the functions of an information sharing controller 212 and a LAN controller 214.

The LAN controller 214 analyzes data received from each of the devices 30 included in the first communication network NT1 via the LAN interface 260, sends the result of analysis and controls the device 30. The LAN controller 214 analyzes data received from each of the devices 30 included in the first communication network NT1 by referring to a protocol stack 228 stored in the flash ROM 220 and takes out the body of data described in conformity with a communication protocol of the source (device 30). The protocol stack 228 includes a plurality of communication protocols for communicating with the devices 30 included in the first communication network NT1. More specifically, the protocol stack 228 includes, for example, TCP/IP, HTTP, ECHO-NET Lite (registered trademark), Z-Wave (registered trademark) and ZigBee (registered trademark). The LAN controller 214 refers to the taken-out body of data and generates and sends data in conformity with a communication protocol corresponding to each destination, such as a communications terminal 90 owned by a user (family member in the home at which the first communication network NT1 is created) or a management server. The communications terminal 90 may be, for example, a PDA (personal digital assistant) such as a smartphone, a tablet or a cell phone.

The LAN controller 214 controls each of the devices 30, for example, based on data received from the user's own communications terminal 90 via the WAN interface 250. For example, when receiving data for giving an instruction to power ON the air conditioner 36, the LAN controller 214 controls the air conditioner 36 via the LAN interface 260 to turn its power ON. Additionally, the LAN controller 214 may control the air conditioner 36, for example, to change the set temperature of the air conditioner 36, based on an instruction received via the WAN interface 250 from a power management server installed by a power company. Controlling the device 30 by the LAN controller 214 includes both the mode that the LAN controller 214 directly sends a command for controlling the device 30 to the device 30 and the mode that the LAN controller 214 sends a command for requesting the controller of the device 30 to perform control to the controller of the device 30.

The information sharing controller 212 selects information to be shared in the network system 100 from information received from each of the devices 30 included in the first communication network NT1 and sends the selected information to the access point 40. The information sharing controller 212 obtains data analyzed by the LAN controller 214, selects information to be sent to the access point 40 and generates data in conformity with a communication protocol (for example, wireless LAN context control protocol (WL-CCP)) used for WDS communication with the access point 40. The information sharing controller 212 uses a unique SSID for information sharing to establish a direct wireless connection with the access point 40 and sends the generated data to the access point 40 via the information sharing interface 240. In the process of the user's information sharing settings, the information to be shared (information to be sent) may be set by the user or may be automatically set based on the information sharing settings.

The information sharing controller 212 also relays data received from outside via the information sharing interface 240 to the access point 40. For example, the information sharing controller 212 of the access point 20 receives information of the rain sensor 38 from the access point 43 via the information sharing interface 240 and relays the received information to the access points 41 and 42. The information sharing controller 212 also notifies the user of information, based on data received from outside via the information sharing interface 240 or based on information received from the device 30 included in the first communication network NT1. Notification of information may be in the form of any of various notifications or notices, for example, a mail sent to the user's own communications terminal 90, a notification (including voice and display) by an application, a voice notification from a speaker (not shown) built in the access point 20, a notification by an alarm sound from an alarm (not shown) included in the access point 20, lighting of an alarm lamp (not shown) included in the access point 20. A notification unit such as a speaker, an alarm or an alarm lamp may be provided separately from the access point 20 and included in the first communication network NT1. The notification unit may be controlled via the LAN controller 214. For example, when rainfall information is received from the rain sensor 38 via the access point 43, a voice notification of, for example, "it's raining" may be given from the speaker built in the access point 20. When hearing this voice notification, for example, the user in the house may take in the laundry.

Figure 3:
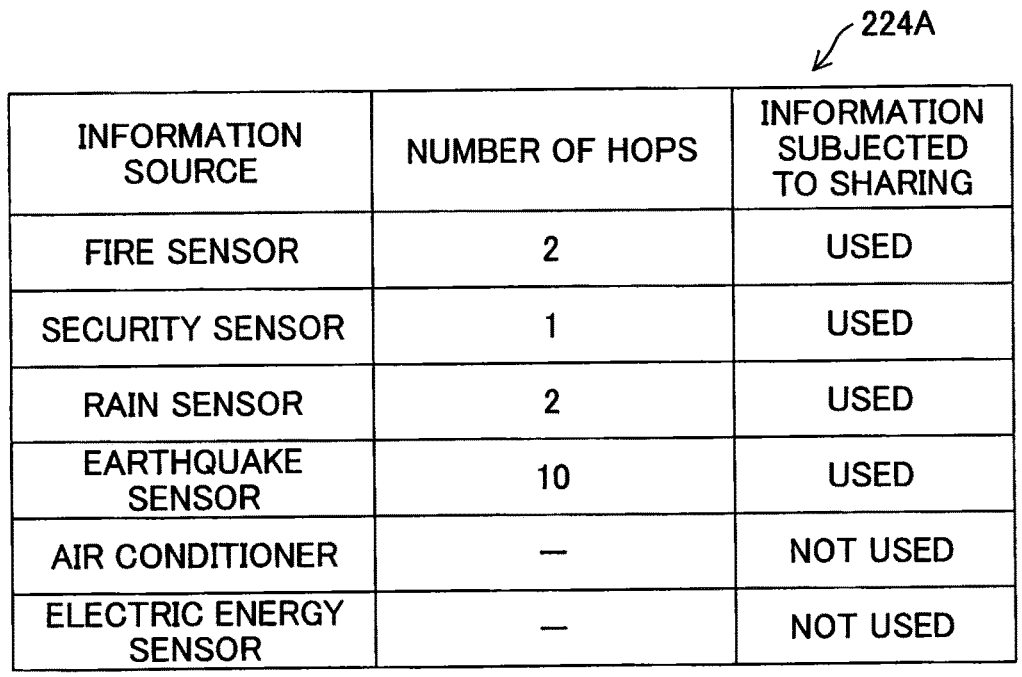
FIG. 3 is a diagram illustrating one example of a coverage area table.

The flash ROM 220 stores a coverage area table 224A, a destination table 226 and a protocol stack 228. FIG. 3 is a diagram illustrating one example of the coverage area table 224A. In the process of sending device information to be shared in the network system 100 (hereinafter called "shared device information"), the access point 20 sends the device information with setting a coverage area of the device information to be sent. The coverage area table 224A denotes a table storing coverage areas. According to this embodiment, the coverage area table 224A also stores requirement or non-requirement for sharing the received information. According to this embodiment, the coverage area is specified by the number of hops which denotes the number of access points possibly routed through. The coverage area is set to a suitable range (range in which information is likely to be useful) with respect to each information source (sensor) of device information to be sent by the access point 20. For example, the coverage area of a security sensor is a very narrow area of a communication network (LAN). The coverage area of a fire sensor or a rain sensor is a little wider range. The coverage area of an earthquake sensor is a further wider range. Transferring all information unlimitedly makes a receiving-side access point likely to receive a large volume of unnecessary information and is likely to increase the processing load at the access point. For example, information of the rain sensor may be used to give an alarm of taking in laundry. The information of the security sensor may be used to share information regarding any suspicious person or prowler. The information of the earthquake sensor may be used to notify of an evacuation center. The numbers of hops used to specify the respective coverage areas are not limited to those of this embodiment but may be set adequately. With regard to the requirement or non-requirement for sharing the received information, information to be shared and information not to be shared are respectively expressed as "used" and "not used" in FIG. 3. The information sources included in the coverage area table 224A are not limited to those of the embodiment but may be a variety of information sources (including sensors and household electrical appliances). The requirement or non-requirement for sharing may also be set adequately.

Figure 4:
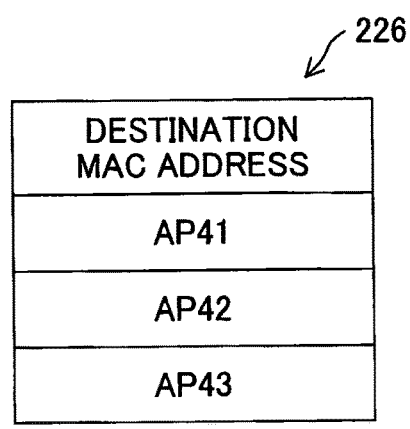
FIG. 4 is a diagram illustrating one example of a destination table.

FIG. 4 is a diagram illustrating one example of the destination table 226. The destination table 226 stores MAC addresses of access points to which the access point 20 sends the shared device information. When receiving a beacon with setting of a unique SSID for information sharing, the access point 20 stores in advance its BSSID (MAC address in wireless LAN). As shown in FIG. 1, in the network system 100 of the embodiment, the three access points 41, 42 and 43 are configured to allow for direct wireless communication with the access point 20. Accordingly, MAC addresses of these access points 41, 42 and 43 are stored in the destination table 226 shown in FIG. 4. The registry and the update of the destination table 226 may be performed by scanning at regular intervals.

The access point 40 has the similar configuration to that of the access point 20. More specifically, the access point 40 is enabled to send information received from each of the devices included in its own LAN (second communication network NT2) to another communication network. A destination table provided in each of the access points 40 stores MAC addresses of access points that allow for direct wireless communication with the access point 40 as described below. The destination table provided in the access point 41 stores MAC addresses of the access points 20, 51 and 52. The destination table provided in the access point 42 stores MAC addresses of the access points 20 and 53. The destination table provided in the access point 43 stores the MAC address of the access point 20. Similarly, each of the access points 50 and 60 is provided with a destination table that stores MAC addresses of access points that allow for direct wireless communication with the access point 50 or 60. Each of the destination tables stores MAC addresses as described below. The destination table provided in the access point 51 stores MAC addresses of the access points 41 and 60. The destination table provided in the access point 52 stores the MAC address of the access point 41. The destination table provided in the access point 53 stores the MAC address of the access point 42. The destination table provided in the access point 60 stores the MAC address of the access point 51.

A-3. Processing for Device Information Sharing in Network System

Figure 5:
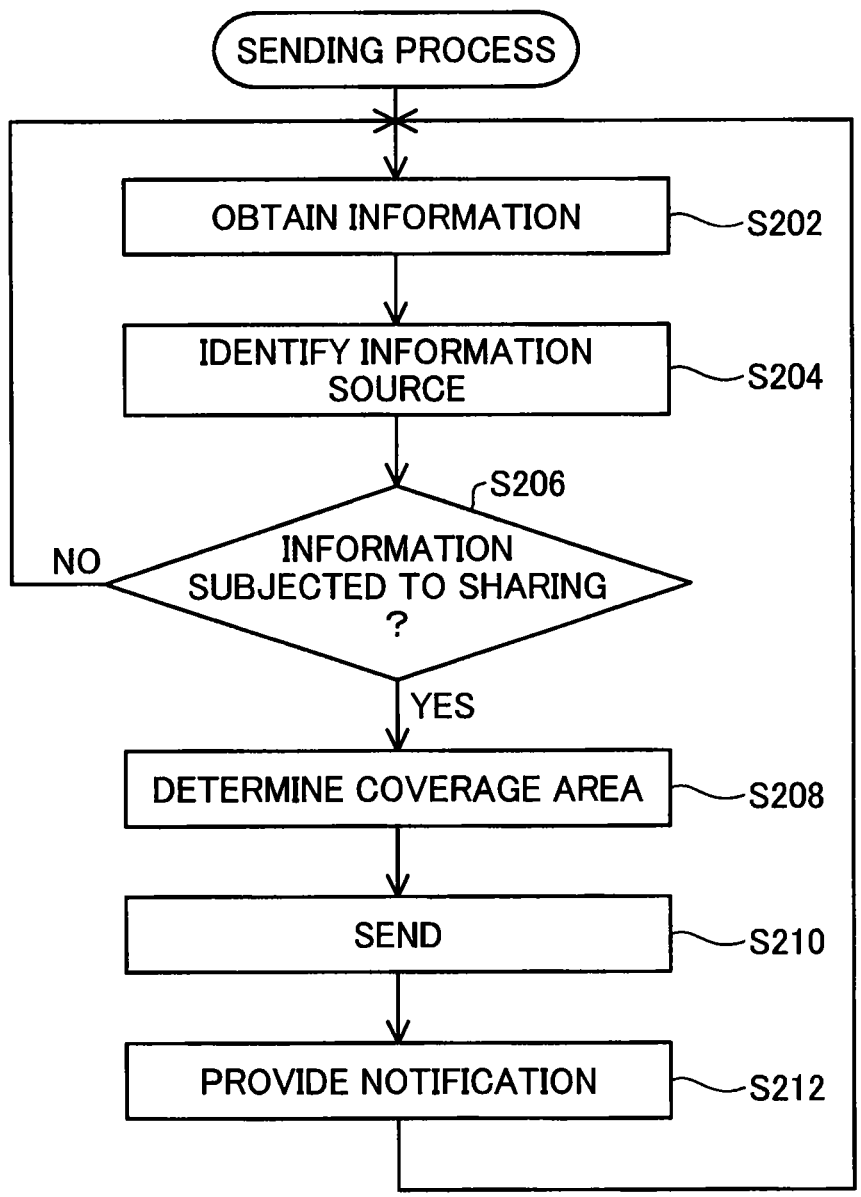
FIG. 5 is a flowchart showing a flow of sending process in the access point.

The following describes the outline of processing for device information sharing in the network system of the embodiment. FIG. 5 is a flowchart showing a flow of sending process in the access point. When the access point 20 in the idle state receives data from one of the security sensor 32, the fire sensor 34 and the air conditioner 36 (step S202), the information sharing controller 212 identifies the source of the data (information source) (step S204). For example, a concrete procedure of identifying the source of the data may refer to a table of relating the source address and the device ID to the source (device) provided in advance in the access point 20 and specify a source corresponding to a source address and a device ID included in the data. The information sharing controller 212 then refers to the coverage area table 224A and determines whether the received data is information subjected to device information sharing (step S206). According to this embodiment, as shown in FIG. 3, information received from the security sensor 32 or the fire sensor 34 is set to the information subjected to sharing. When it is determined at step S206 that the received data is information subjected to sharing, the information sharing controller 212 refers to the coverage area table 224A to determine (set) the coverage area (step S208). The information sharing controller 212 subsequently refers to the destination table 226 and generates and sends shared information data, which is addressed to each of the access points 41, 42 and 43 and includes information to be shared (shared device information) and information regarding the coverage area (number of hops) (step S210). The information sharing controller 213 then provides a notification suitable for the received information (step S212) and returns to step S202. When it is determined at step S206 that the received data is not information subjected to sharing, on the other hand, the information sharing controller 212 returns to step S202. For example, when the security sensor 32 is activated, the notification provided at step S212 may be sounding the alarm included in the access point 20 and sending a mail stating that "the security sensor is activated" to the user's own communications terminal 90. In another example, when the fire sensor 34 is activated, the notification provided at step S212 may be giving a voice notification like "the fire sensor is activated" from a speaker built in the access point 20 and sending a mail stating that "the fire sensor is activated" to the user's own communications terminal 90.

The following describes a concrete procedure of the sending process with reference to FIG. 5 on the assumption that the access point 20 receives data from the security sensor 32. The information sharing controller 212 of the access point 20 in the idle state obtains data from the security sensor 32 via the LAN controller 214 (step S202). The information sharing controller 212 subsequently identifies that the source (information source) is the security sensor 32, based on the source address included in the data analyzed by the LAN controller 214 (step S204). As described above, since the information from the security sensor 32 is the information subjected to sharing (step S206: YES), the information sharing controller 212 refers to the coverage area table 224A to extract the number of hops corresponding to the security sensor (step S208). The information sharing controller 212 subsequently refers to the destination table 226 and generates and sends shared information data, which is addressed to each of the access points 41, 42 and 43 and includes information regarding activation of the security sensor 32 (shared device information) and information regarding the coverage area (number of hops=1) (step S210). The information sharing controller 212 then sounds the alarm included in the access point 20 and sends a mail stating that "the security sensor is activated" to the user's own communications terminal 90 (step S212).

Figures 6, 7:
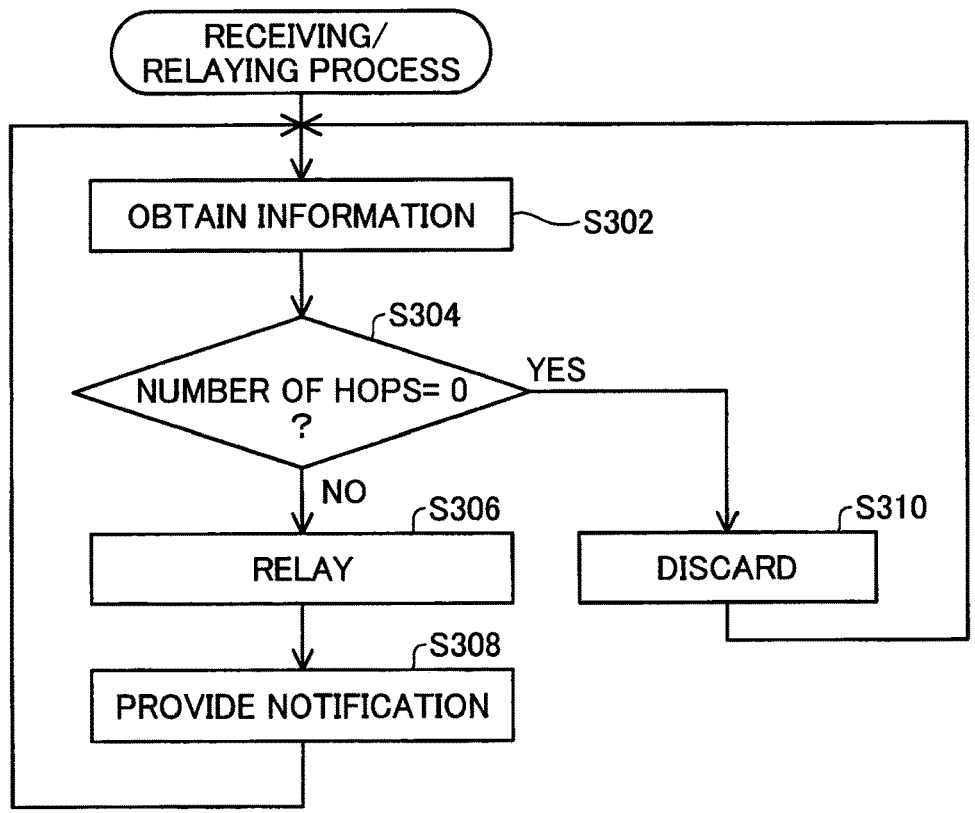
FIG. 6 is a flowchart showing a flow of receiving and relaying process in the access point.
FIG. 7 is diagram illustrating one example of a coverage area table according to a second embodiment.

FIG. 6 is a flowchart showing a flow of receiving and relaying process in the access point. The following describes the outline of processing in the access point 40 with reference to FIG. 6. The access point 40 has the similar configuration to that of the access point 20. In the description below, the components included in the access point 40 are expressed by like numerical symbols to those allocated to the corresponding components included in the access point 20 with substitution of "2" with "4" as the first digit. When the access point 40 in the idle state receives shared information data (step S302), an information sharing controller 412 determines whether the number of hops included in the received shared information data is equal to 0 (step S304). When it is determined at step S304 that the number of hops is not equal to 0 (step S304: NO), the information sharing controller 412 modifies the received shared information data and relays the modified shared information data to the access point 50 (step S306). More specifically, the information sharing controller 412 subtracts "1" from the number of hops included in the received shared information data to change the number of hops. The information sharing controller 412 subsequently refers to a destination table 426 and modifies the registry addressed to the access point 50 to modified shared information data including information to be shared (shared device information) and the changed number of hops and sends (relays) the modified shared information data. The information sharing controller 412 then provides a notification suitable for the received information (step S308) and returns to step S302. The notification provided at step S308 may be similar to the notification provided in the access point 20 described above or may employ a different method of notification. The method of notification may be selectively determined by the user according to the configuration of the access point 40 and the user's preference. When it is determined at step S304 that the number of hops is equal to 0 (step S304: YES), on the other hand, the information sharing controller 412 discards the received shared information data and returns to step S302. In other words, when the number of hops included in the shared information data is equal to 0, the received information is neither used in the second communication network NT2 nor relayed to another LAN.

The following describes a concrete procedure of the receiving and relaying process in the access point 41 with reference to FIG. 6 on the assumption that the access point 41 receives shared information data regarding the security sensor 32 from the access point 20. The shared information data which the access point 41 receives via the information sharing I/F by direct wireless connection with the access point 20 includes the information regarding activation of the security sensor 32 (shared device information) and the information regarding the coverage area (number of hops=1) as described above. In the configuration of the access point 41, the components equivalent to those of the access point 40 are expressed by the like numerical symbols to those of the access point 40.

The information sharing controller 412 of the access point 41 in the idle state receives the above shared information data from the access point 20 (step S302). Since the number of hops included in the received shared information data is equal to "1", the information sharing controller 412 determines that the number of hops is not equal to 0 (step S304: NO). The information sharing controller 412 then subtracts "1" from the number of hops included in the received shared information data to the number of hops equal to 0. The information sharing controller 412 subsequently refers to the destination table 426 and modifies the registry addressed to the access points 51 and 52 to modified shared information data including information regarding activation of the security sensor 32 in the first communication network NT1 (shared device information) and information regarding the coverage area (number of hops=0). The information sharing controller 412 refers to the destination table 426 and sends (relays) the modified shared information data to the access points 51 and 52 (step S306). Based on the received shared information data, the information sharing controller 412 generates voice data to notify of suspicious person information regarding a suspicious person or prowler via a built-in speaker and sends a mail to notify of the suspicious person information to the user's own communications terminal 90 (step S308). The suspicious person information provided may be, for example, "the security sensor in the neighborhood of your home is activated".

The similar series of processing is also performed in the access points 42 and 43. As described above, a destination table in the access point 43 has only the registry regarding the access point 20. The access point 43 accordingly provides a notification (step S308) without the relaying process (step S306). The access point 43 is located in a condominium building. For example, the notification provided may be sending mails to communications terminals owned by registered residents among residents in respective condominiums or providing a voice notification from speakers for condominium management placed in the respective condominiums. Instead of or in addition to the voice notification, a display notification may be provided using, for example, an electric bulletin board placed in a common entrance hall of the condominium building.

The following describes a concrete procedure of the receiving and relaying process in the access point 43 with reference to FIG. 6 on the assumption that the access point 51 receives the above shared information data from the access point 41. The shared information data which the access point 51 receives via the information sharing I/F by direct wireless connection with the access point 41 includes the information regarding activation of the security sensor 32 in the first communication network NT1 (shared device information) and the information regarding the coverage area (number of hops=0) as described above. The access point 51 (50) has the similar configuration to that of the access point 20. In the description below, the components included in the access point 51 are expressed by like numerical symbols to those allocated to the corresponding components included in the access point 20 with substitution of "2" with "5" as the first digit.

An information sharing controller 512 of the access point 51 in the idle state receives the above shared information data from the access point 41 (step S302). Since the number of hops included in the received shared information data is equal to "0" (step S304: YES), the information sharing controller 512 discards the received shared information data (step S310) and returns to the idle state (step S302). The similar series of processing is also performed in the access point 52. In other words, the information regarding the security sensor 32 sent from the access point 20 is neither used in the third communication network NT3 nor relayed to another LAN.

As described above, the coverage area of information from the security sensor is set to the number of hops=1 (as shown in the coverage area table 224A of FIG. 3), so that the information from the security sensor is used only in the second communication network NT2 in the extent of the coverage area AS1 shown in FIG. 1. According to this embodiment, when the number of hops included in the received shared information data is equal to 0, the shared information data is discarded and is not relayed. According to a modification, when the number of hops is equal to 0, the procedure may provide a notification without relaying the information (accordingly, the information is used only in the own LAN). This eliminates the necessity of unnecessary transmission.

The following describes a concrete procedure of the receiving and relaying process in the access points 41, 51 and 60 with reference to FIG. 6 on the assumption that the access point 20 sends information from the fire sensor 34 (number of hops=2). The information sharing controller 412 of the access point 41 in the idle state receives the above shared information data from the access point 20 (step S302). Since the number of hops included in the received shared information data is equal to "2", the information sharing controller 412 determines that the number of hops is not equal to 0 (step S304: NO). The information sharing controller 412 then subtracts "1" from the number of hops included in the received shared information data to the number of hops equal to 1. The information sharing controller 412 subsequently refers to the destination table 426, modifies the registry addressed to the access points 51 and 52 to modified shared information data including information regarding activation of the fire sensor 34 in the first communication network NT1 (shared device information) and information regarding the coverage area (number of hops=1) and sends (relays) the modified shared information data (step S306). Based on the received shared information data, the information sharing controller 412 generates voice data to notify of fire information via a built-in speaker and sends a mail to notify of the fire information to the user's own communications terminal 90 (step S308). The fire information provided may be, for example, "the fire sensor in the neighborhood of your home is activated" or "a fire started at XX town".

The information sharing controller 512 of the access point 51 in the idle state receives the above shared information data from the access point 41 (step S302). Since the number of hops included in the received shared information data is equal to "1", the information sharing controller 512 determines that the number of hops is not equal to 0 (step S304: NO). The information sharing controller 512 then subtracts "1" from the number of hops included in the received shared information data to the number of hops equal to 0. The information sharing controller 512 subsequently refers to a destination table 526, modifies the registry addressed to the access point 60 to modified shared information data including information regarding activation of the fire sensor 34 in the first communication network NT1 (shared device information) and information regarding the coverage area (number of hops=0) and sends (relays) the modified shared information data (step S306). Based on the received shared information data, the information sharing controller 512 provides a similar notification to the notification provided in the access point 41 (step S308).

The following describes a procedure of the receiving and relaying process in the access point 60. The access point 60 has the similar configuration to that of the access point 20. In the description below, the components included in the access point 60 are expressed by like numerical symbols to those allocated to the corresponding components included in the access point 20 with substitution of "2" with "6" as the first digit. An information sharing controller 612 of the access point 60 in the idle state receives the above shared information data from the access point 51 (step S302). Since the number of hops included in the received shared information data is equal to "0" (step S304: YES), the information sharing controller 612 discards the received shared information data (step S310) and returns to the idle state (step S302). In other words, the information regarding the fire sensor 34 sent from the access point 20 is neither used in the fourth communication network NT4 nor relayed to another LAN. As described above, the coverage area of information from the fire sensor is set to the number of hops=2 (as shown in the coverage area table 224A of FIG. 3), so that the information from the fire sensor is used only in the second communication network NT2 and the third communication network NT3 in the extent of the coverage area AS2 shown in FIG. 1.

As described above, in the network system 100 of this embodiment, the access points 20, 40, 50 and 60 have the mesh network functions and thereby enable information to be shared among a plurality of communication networks (LANs) without depending on an external network infrastructure. The access points 20, 40, 50 and 60 have the information sharing interfaces and use the information sharing unique SSID to send and receive the shared information data. This configuration limits sharing of information to between specified access points. In other words, any access point that allows for direct wireless communication with the access point 20, 40, 50 or 60 but does not have the information sharing unique SSID is not allowed to send and receive the shared information data. The shared information data is transferred by only direct wireless communication between access points, so that the transfer of the shared information data is limited to the coverage area of radio wave. This also limits the range of information sharing. Additionally, setting the coverage area which the shared information data reaches limits the coverage area and thereby suppresses reception of unnecessary information due to unlimited transfer of information.

The configuration of this embodiment selectively sends the information to be shared between a plurality of communication networks and thereby enables the person who places the access point (for example, a family member) to specify information that may be released. The coverage area of information is limited with respect to each information to be shared (sensor), so that the information can be shared in a required range according to the contents of the information.

The following describes network systems of second to fourth embodiments. The network systems of the second to the fourth embodiments have similar configurations to that of the network system 100 of the first embodiment, except configurations involved in different methods of setting the coverage area of information from the access point 20 to the access point 40. Accordingly, the like components are expressed by the like numerical symbols and are not specifically described.

B. Second Embodiment

The access point 20 of the second embodiment additionally stores location information in the flash ROM 220 and has a coverage area table 224B in place of the coverage area table 224A. Like the first embodiment, in the second embodiment, the access points 40, 50 and 60 have the similar configurations to that of the access point 20.

The second embodiment uses the latitude and longitude of the location where the access point is placed, as location information. The latitude and longitude are obtained by the GPS (global positioning system) function of the access point 20. According to other embodiments, for example, the person who places the access point 20 (user) may manually enter the latitude and longitude on a Web setting screen of the access point 20 or the information on the latitude and longitude obtained by the GPS function of the user's own smartphone may be obtained via NFC, Bluetooth (registered trademark), USB or Wi-Fi.

FIG. 7 is a diagram illustrating one example of the coverage area table according to the second embodiment. As shown in FIG. 7, in the coverage area table 224B, the coverage area is specified by distance (m). The coverage area table 224B of this embodiment does not include the requirement or non-requirement for sharing the received information. This embodiment separately provides a sharing requirement table (not shown) specifying the requirement or non-requirement for sharing the received information.

The following describes differences of the processing for device information sharing in the network system of the second embodiment from the processing of the first embodiment. A procedure of the sending process in the access point 20 is described first with reference to FIG. 5. In the second embodiment, the information sharing controller 212 of the access point 20 performs the processing of steps S202 and S204 like the first embodiment and refers to the sharing requirement table and determines whether the received data is information subjected to device information sharing at step S206. At step S208, the information sharing controller 212 refers to the coverage area table 224B and determines the coverage area. The information sharing controller 212 subsequently refers to the destination table 226 and generates and sends shared information data, which are respectively addressed to the access points 41, 42 and 43 and include information to be sent (shared device information), the location information (latitude and longitude) of the access point 20 and the coverage area (distance (m)) (step S210) and provides a notification (step S212) like the first embodiment.

A procedure of the receiving and relaying process in the access point 40 is described with reference to FIG. 6. When the access point 40 in the idle state receives shared information data (step S302), the access point 40 refers to the location information (latitude and longitude) provided in itself and determines whether the location of the access point 40 is in the extent of the coverage area included in the received shared information data at step S304. More specifically, the information sharing controller 412 calculates an inter-access point distance based on the location information (latitude and longitude) of the access point 20 (source) included in the shared information data and the location information (latitude and longitude) of the access point 40, and determines whether the inter-access point distance is within the coverage area. When it is determined that the location of the access point 40 is in the extent of the coverage area (step S304: YES), the information sharing controller 412 changes neither the latitude and longitude of the access point 20 nor the coverage area included in the received shared information data, but refers to the destination table 426, modifies the registry addressed to the access point 50 to modified shared information data and sends (relays) the modified shared information data to the access point 50 (step S306) and provides a notification (step S308) like the first embodiment. When it is determined that the location of the access point 40 is out of the coverage area (step S304: NO), on the other hand, the information sharing controller 412 discards the shared information data (step S310) like the first embodiment and does not relay the shared information data to any other access point.

The network system of the second embodiment enables information to be shared between communication networks (LANS) within a specified distance from an access point as the source.

The second embodiment specifies the coverage area by the distance from the source (access point 20). The access point 20 sends the shared information data that includes the latitude and longitude of the access point 20 and the coverage area (distance). According to another embodiment, the access point 20 may be configured to convert the distance of the coverage area into the number of hops and send the shared information data that includes the number of hops. The following is one example of such configuration.

The access point 20 additionally stores a conversion table 225 in the flash ROM 220. FIG. 8 is a diagram illustrating one example of the conversion table. As shown in FIG. 8, the conversion table 225 is provided as a table showing the relationship between the coverage area and the number of hops. The information sharing controller 212 of the access point 20 refers to the coverage area table 224B and the conversion table 225 and determines the number of hops according to the information to be shared in the process of determining the coverage area (step S208 in FIG. 5). At step S210, the information sharing controller 212 generates and sends shared information data including the information to be shared and the number of hops, like the first embodiment.

The access point 40 performs the receiving and relaying process similar to that of the first embodiment. This reduces the processing load of, for example, calculation of the inter-access point distance in the receiving and relaying process, while limiting the range of information sharing according to the distance.

In a modification of the second embodiment, the coverage area table 224A of the first embodiment (shown in FIG. 3)

and the above conversion table 225 (shown in FIG. 8) may be provided in place of the coverage area table 224B, and the information sharing controller 212 of the access point 20 may refer to the coverage area table 224A and the conversion table 225 and determine the coverage area according to the information to be shared in the process of determining the coverage area (step S208 in FIG. 5). In other words, the number of hops may be converted into the distance, and the range of information sharing may be set on the basis of the distance.

C. Third Embodiment

The access point 20 of the third embodiment additionally stores location information 222 in the flash ROM 220 and has a coverage area table 224D in place of the coverage area table 224A. Like the first embodiment, in the third embodiment, the access points 40, 50 and 60 have the similar configurations to that of the access point 20.

FIG. 9 is a diagram showing one example of the location information 222. The location information 222 is information regarding the location where the access point 20 is placed and includes the latitude and longitude and the address as illustrated. The latitude and longitude are obtained by the GPS (global positioning system) function of the access point 20. The address is converted from the obtained latitude and longitude by reverse geocoding technique. According to other embodiments, for example, the person who places the access point 20 may manually enter the location information 222 on a Web setting screen of the access point 20 or the information on the latitude and longitude obtained by the GPS function of the user's own smartphone may be obtained via NFC, Bluetooth (registered trademark), USB or Wi-Fi.

FIG. 10 is a diagram illustrating one example of the coverage area table according to the third embodiment. As shown in FIG. 10, in the coverage area table 224D, the coverage area is specified by the address. Like the second embodiment, in this embodiment, the coverage area table 224D does not include the requirement or non-requirement for sharing the received information, and a sharing requirement table is provided separately from the coverage area table 224D.

The following describes differences of the processing for device information sharing in the network system of the third embodiment from the processing of the first embodiment. A procedure of the sending process in the access point 20 is described first with reference to FIG. 5. In the third embodiment, the information sharing controller 212 of the access point 20 performs the processing of steps S202 and S204 like the first embodiment and refers to the sharing requirement table and determines whether the received data is information subjected to device information sharing at step S206. At step S208, the information sharing controller 212 refers to the coverage area table 224D and determines the coverage area. The information sharing controller 212 subsequently refers to the destination table 226 and generates and sends shared information data, which are respectively addressed to the access points 41, 42 and 43 and include information to be sent (shared device information) and the coverage area (address) (step S210) and provides a notification (step S212) like the first embodiment.

A procedure of the receiving and relaying process in the access point 40 is described with reference to FIG. 6. When the access point 40 in the idle state receives shared information data (step S302), the access point 40 refers to the location information provided in the access point 40 itself and determines whether the address of the access point 40 is in the extent of the coverage area (address) included in the received shared information data at step S304. For example, it is assumed that the address where the access point 40 is placed (address described in the location information) is "Ohsu 2-chome, 10-2, Naka-ku, Nagoya, Aichi". When the coverage area included in the shared information data is either "Naka-ku, Nagoya, Aichi" or "Ohsu, Naka-ku, Nagoya, Aichi", it is determined that the address of the access point 40 is in the extent of the coverage area. When the coverage area is "Ohsu 3-chome, Naka-ku, Nagoya, Aichi", on the other hand, it is determined that the address of the access point 40 is out of the coverage area. When it is determined that the location of the access point 40 is in the extent of the coverage area (step S304: YES), the information sharing controller 412 does not change the coverage area included in the received shared information data, but refers to the destination table 426, modifies the registry addressed to the access point 50 to modified shared information data and sends (relays) the modified shared information data to the access point 50 (step S306) and provides a notification (step S308) like the first embodiment. When it is determined that the location of the access point 40 is out of the coverage area (step S304: NO), on the other hand, the information sharing controller 412 discards the shared information data (step S310) like the first embodiment and does not relay the shared information data to any other access point.

The third embodiment enables device information to be shared within a neighboring area which the administrator of the access point 20 as the source belongs to. For example, instead of providing a notification of suspicious person information by circular notice in the neighboring area, this technique may be employed to enable the information regarding the security sensor to be shared in the neighboring area more quickly.

D. Fourth Embodiment

The access point 20 of the fourth embodiment stores a coverage area table 224E, instead of the coverage area table 224A, in the flash ROM 220.

FIG. 11 is a diagram illustrating one example of the coverage area table according to the fourth embodiment. In the fourth embodiment, the coverage area is specified by the number of hops with regard to each information source, based on the received signal strength indication (RSSI) relative to the access point 40 as the destination. The flash ROM 220 of the access point 20 additionally stores an RSSI table (not shown) that specifies the relationship between RSSI and the number of hops with regard to each information source. When receiving a beacon with setting of a unique SSID for information sharing, the information sharing controller 212 obtains an RSSI relative to the access point 40, refers to the RSSI table and creates the coverage area table 224E. The coverage area table 224E may be created and updated by scanning at regular intervals. Like the second embodiment, in this embodiment, the coverage area table 224E does not include the requirement or non-requirement for sharing the received information, and a sharing requirement table is provided separately from the coverage area table 224E.

The following describes differences of the processing for device information sharing in the network system of the fourth embodiment from the processing of the first embodiment. Like the access point 20 of the first embodiment, the access point 20 of the fourth embodiment performs the processing of steps S202 and S204 in FIG. 5 and refers to the sharing requirement table and determines whether the received data is information subjected to device information sharing at step S206. The information sharing controller 212 refers to the coverage area table 224E and determines the coverage area (number of hops) with regard to each destination at step S208. The information sharing controller 212 subsequently generates and sends shared information data including information to be shared (shared device information) and the coverage area (number of hops) with regard to each destination (step S210). For example, when the information to be shared is information regarding the fire sensor, the shared information data addressed to the access point 41 includes the "number of hops=5" as the coverage area, and the shared information data addressed to the access points 42 and 43 include the "number of hops=8" as the coverage area. The procedure of the receiving and relaying process in the access point 40 of the fourth embodiment is similar to that of the first embodiment and is thus not specifically described here.

The access point 20 of the fourth embodiment specifies the coverage area of the shared information data based on the RSSI relative to the access point 40 as the destination and thereby limits the range of information sharing according to the communication environment with the access point 40 that allows for direct wireless connection. This configuration also adequately limits the coverage area of information to be shared.

E. Modifications

The disclosure is not limited to any of the embodiments described herein but may be implemented by a diversity of other configurations without departing from the scope of the disclosure. For example, the technical features of the embodiments corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. Examples of possible modification are given below.

E-1. Modification 1

In the above embodiments, the access point 20 is configured to enable information from the device 20 included in its own LAN (first communication network NT1) to be shared with another LAN (second communication network NT2 and the like). The information to be shared is, however, not limited to the information in its own LAN. For example, the information to be shared may be information in a PAN (personal area network) configured by wireless communication by, for example, Zigbee (registered trademark) or Z-Wave (registered trademark) or wired communication via bus connection such as USB or HDMI (registered trademark). According to another configuration, the access point 20 may provide information received from, for example, the communications terminal 90 via the Internet INT to another LAN (second communication network NT2). For example, information regarding a natural disaster (for example, tornado, thunder or typhoon) received via the Internet INT may be sent to the access point 40 included in the second communication network NT2. This configuration increases the likelihood that information regarding, for example, a natural disaster is notified promptly.

E-2. Modification 2

The above embodiments describes the configurations of limiting the range of information sharing, but another configuration may transfer information unlimitedly by direct wireless connection between access points. For example, sharing information regarding a natural disaster in a wider area without limitation increases the likelihood of suppressing damage from spreading.

E-3. Modification 3

The above embodiments describe the configurations that the coverage area is specified by the number of hops from the access point 20 (source), the distance from the access point 20 or the address, but these are not restrictive. For example, the coverage area may be specified by an upper limit and a lower limit (for example, ±1 degree) of latitude and longitude relative to the latitude and longitude of the access point 20. A plurality of different types of conditions may be combined; for example, the coverage area may be specified by the combination of the distance and the address, such as within the distance of A km from the access point 20 and within XX town, or within the distance of A km from the access point 20 or within XX town. The coverage area may also be specified by taking into account another specific information in addition to the information from the information source. For example, when the information source is a fire sensor, the distance of the coverage area may be varied according to the direction by taking into account specific information such as the direction of wind or the wind speed in addition to the predetermined distance from the access point 20. Any of these modifications adequately limits the range of information sharing according to the type of information. The coverage area is specified with regard to each information source (sensor) in the above embodiment, but may not be specified with regard to each information source. In this modification, the shared device information may be transferred within an identical coverage area with regard to all the information sources.

E-4. Modification 4

The above embodiments describe the sensing information of the security sensor, the fire sensor or the rain sensor as the examples of the device information to be shared. These examples are, however, not restrictive, and the information to be shared may be determined adequately. For example, the access point 20 may sum up the electrical energy used by the plurality of devices 30 included in the first communication network NT1 and share information regarding the total amount of electrical energy. Similarly information regarding the water bill or information regarding the used amount of gas may be shared. This will contribute to a peak shift or improvement of energy-saving awareness. In another example, the sensing information of a motion sensor, a bed sensor or the like may be shared. Sharing the information regarding a motion sensor or a bed sensor in the neighborhood facilitates, for example, protection of the elderly with dementia who has wondering syndromes. In another example, the conditions of pet animals, agricultural crops or farm animals may be monitored by a sensor, and the monitor information may be shared in the neighborhood, for the purpose of mutual support. The sensor may employ any of various sensing techniques, such as infrared, ultrasonic wave, visible light, temperature or electrostatic capacitance.

E-5. Modification 5

In the above embodiments, the procedure of processing may be modified to include an additional step of determining whether received information is to be used or not in the access point receiving the shared information data. The user may selectively specify, in advance, information to be used and information not to be used. When the access point receives information specified as the information not to be used, the access point may relay the received information but may not provide a notification. For example, the user may specify the setting such that information of the rain sensor is not used in the second communication network NT2 in the home without any day-time population. This configuration enables the user to use only the required information. Another modified configuration may specify the requirement or non-requirement for use, based on the number of hops. For example, non-requirement for use of received information may be specified when it is determined that the source is far away, based on the number of hops set at the source and the number of hops at the information receiving time.

E-6. Modification 6

The above embodiments describe the access points as the wireless connection device. The wireless connection device is, however, not limited to the access point but may be any wireless connection device that allows for direct wireless connection with another specific device included in another LAN. For example, the wireless connection device may be a router having mesh functions or a communications terminal (computer) having mesh functions.

E-7. Modification 7

Any of the access points 20, 41, 42, 43, 51, 52, 53 and 60 of the above embodiments provided as the wireless device may be a movable wireless device having an internal power supply. For example, the movable wireless device may be implemented by specified functions of a mobile terminal that includes a battery as the internal power supply and makes wireless communication using electric power supplied from the battery. The mobile terminal may be any terminal that is capable of sending and receiving wireless data, for example, a smartphone or a mobile router. Such a mobile terminal may be mounted on a moving body to dynamically change its current location and generate and send shared information or receive and relay the sent shared information. When the moving body stays or is at stop, the mobile terminal is allowed to generate and send shared information or receive and relay the sent shared information at the position where the moving body stays or stops. The moving body may be, for example, a ground moving body that moves on the ground such as a bicycle, a motorbike or an automobile or an aerial moving body that moves in the air, such as a balloon, a helicopter or an unmanned aerial vehicle (drone). Providing the aerial moving body with the functions of the access point allows for hopping of the shared information or allows the aerial moving body to be included as a hop target during transmission of the shared information by a ground moving body. For example, the mobile terminal may be provided separately from the moving body. In another example, the functions of the mobile terminal may be incorporated in and integrated with a moving body and provided as a moving body with communication functions.

The movability of the movable wireless device enables the wireless device to obtain information at a moving destination, for example, climate information, traffic information or atmosphere information and generate shared information. The movable wireless device may be located in an area where no fixed wireless device is located, in order to temporarily serve as an access point and send and relay shared information without unintentional disconnection.

The movable wireless device of Modification 7 may be configured not to send the shared information or not to receive or relay the shared information according to the current location of the wireless device. For example, when the current location of the movable wireless device is included in a predetermined specific location that requires protection of classified information, it may not be allowed to send shared information generated based on information collected at this current location or to receive or relay shared information generated at this current location. When the current location is adjacent to or included in a range of any of specified locations such as diplomatic establishments of various nations and specified districts and regions such as defense facilities, it may not be allowed to send shared information generated based on information collected at this current location or to receive or relay shared information generated at this current location. The location of any of such specified locations and districts may be identified by using latitude and longitude information of map database. The movable wireless device may determine whether its current location, which can be identified, for example, based on triangulation using GPS signals, radio waves from radio base stations and/or wireless access points, or location information of the radio base stations and/or wireless access points, is included in a predetermined specific location.

Figure 12:
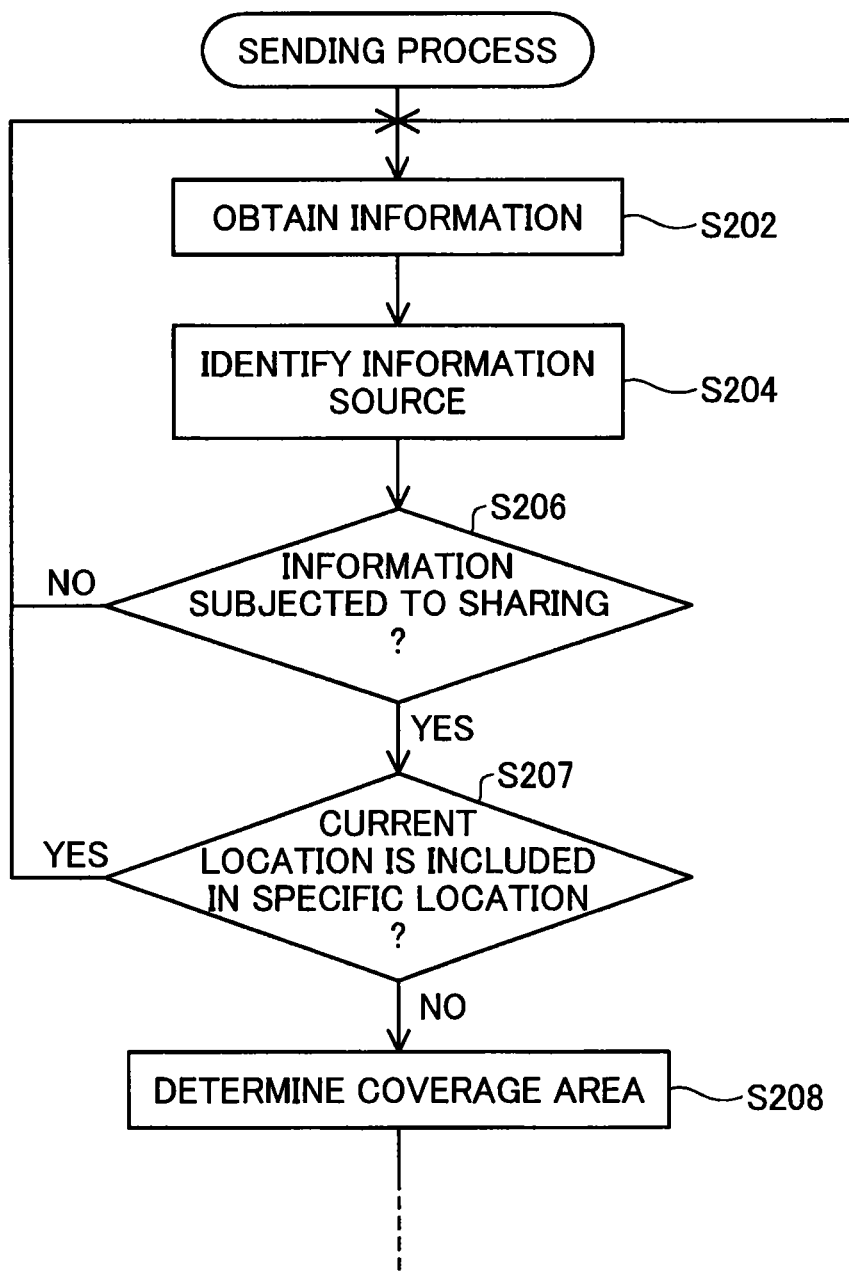
FIG. 12 is a partial flowchart showing a modified flow of FIG. 5 by addition of a step of determining whether the sending process is to be performed according to the current location of the access point of Modification 7.
Figure 13:
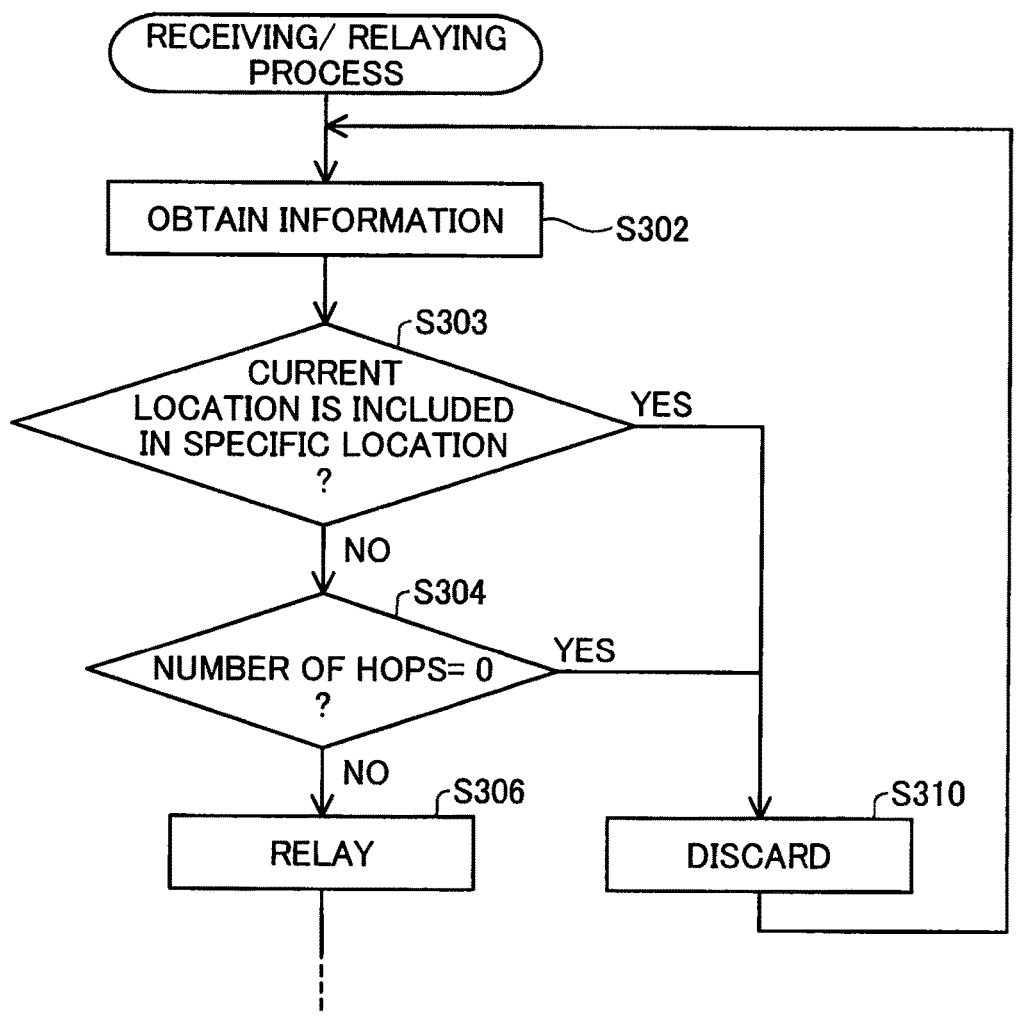
FIG. 13 is a partial flowchart showing a modified flow of FIG. 6 by addition of a step of determining whether the receiving and relaying process is to be performed according to the current location of the access point of Modification 7.

The following describes a sending process and a receiving and relaying process performed in the access point 20 of Modification 7 with reference to FIGS. 12 and 13. FIG. 12 is a flowchart showing a modified flow of FIG. 5 by addition of a step of determining whether the sending process is to be performed according to the current location of the access point of Modification 7. FIG. 13 is a flowchart showing a modified flow of FIG. 6 by addition of a step of determining whether the receiving and relaying process is to be performed according to the current location of the access point of Modification 7.

The following description with reference to FIG. 12 specifically describes a flow when data is received from the security sensor 32 among various information sources, but the same applies to another flow when data is received from another information source such as the fire sensor 34 or the air conditioner 36. With reference to FIG. 12, after determining whether the information from the security sensor 32 is the information subjected to sharing (step S206: YES), the information sharing controller 212 determines whether the current location of the access point 20 is included in a predetermined specific location (step S207). When it is determined that the current location of the access point 20 is included in the predetermined specific location (step S207: YES), the information sharing controller 212 returns to step S202 and waits for a next input of data from any of the sensors. When it is determined that the current location of the access point 20 is not included in the predetermined specific location (step S207: NO), on the other hand, the information sharing controller 212 refers to the coverage area table 224A to extract the number of hops corresponding to the security sensor (step S208). The steps of the sending process other than step S207 are identical with those of FIG. 5 and are thus not described in detail here. The flowchart of FIG. 12 determines whether the current location of the access point 20 is included in the predetermined specific location (step S207) after determining that the received data is the information subjected to sharing (step S206: YES). One modified flow may determine whether the current location is included in the predetermined specific location (step S207), irrespective of whether the received data is the information subjected to sharing or not (i.e., without the determination of step S206). The modified flow may perform the sending process when the current location is not included in the predetermined specific location (step S207: NO), and may not perform the sending process when the current location is included in the predetermined specific location (step S207: YES).

The following description with reference to FIG. 13 specifically describes a flow using shared information based on the data received from the security sensor 32 by taking into account the above description with reference to FIG. 12, but the same applies to another flow using shared information based on the data received from another information source such as the fire sensor 34 or the air conditioner 36. With reference to FIG. 13, when the information sharing controller 412 of the access point 41 in the idle state receives the above shared information data from the access point 20 (step S302), the information sharing controller 412 determines whether the current location of the access point 41 is included in a predetermined specific location (step 303). When it is determined that the current location of the access point 41 is included in the predetermined specific location (step S303: YES), the information sharing controller 412 discards the received shared information data (step S310) and returns to the idle state (step S302). When it is determined that the current location of the access point 41 is not included in the predetermined specific location (step S303: NO), on the other hand, the information sharing controller 412 proceeds to step S304. The steps of the receiving and relaying process other than step S303 are identical with those of FIG. 6 and are thus not described in detail here. This receiving and relaying process may be performed in any access point that receives shared information from another access point and relays the received shared information to yet another access point. The receiving and relaying process is not limited to the access point 41 but may be performed similarly in any of the other access points 42, 43, 51 to 53 and 60.

The flowchart of FIG. 13 performs the relaying process when the number of hops is not equal to 0 (step S304: NO) after the determination that the current location is not included in the predetermined specific location (step S303: NO). One modified flow may determine whether the current location is included in the predetermined specific location (step S303), irrespective of whether the number of hops is equal to 0 or not (i.e., without the determination of step S304). The modified flow may perform the relaying process when the current location is not included in the predetermined specific location (step S303: NO), and may not perform the relaying process when the current location is included in the predetermined specific location (step S303: YES). In other words, the information sharing controller 412 of the access point 41 may perform the relaying process (step S306) without modifying the received shared information. When the access point 41 is a movable access point, it is difficult to predict the presence of the movable access point in advance. The access point 41 may thus be unlikely to provide a desired number of hops by subtraction of the number of hops. When the access point 41 is a movable access point, the access point 41 may perform the relaying process without subtraction of the number of hops, i.e., without modifying the shared information.

In the wireless device of the above first aspect, the circuitry may be further configured to specify a coverage area which the shared information reaches and include information regarding the set coverage area in the shared information. This aspect may limit the coverage area which the shared information reaches and thereby enables information useful for the user to be sent within a limited range.

In the wireless device of the above first aspect, the coverage area may be specified, based on at least one of an address, a number of hops, a distance and latitude and longitude. This aspect may readily and adequately limit the coverage area.

In the wireless device of the above first aspect, the coverage area may be specified with respect to each specific information. This aspect enables the coverage area which the specific information reaches to be differed according to the contents of the specific information.

In the wireless device of the above first aspect, the specific information may include information received from at least one of a weather sensor, an earthquake sensor, a security sensor and a fire sensor. This aspect may provide information regarding a sensor included in its own LAN to a specific LAN in the neighborhood, thus contributing to, for example, security-related or disaster prevention-related cooperation in the neighboring area.

In the wireless device of the above first aspect, the circuitry may be further configured to select the specific information out of information received by the wireless device via the Internet, generate the shared information and send the generated shared information via the information sharing interface to the one or more other wireless device. This aspect enables information received via the Internet to be shared.

In the wireless device of the above first aspect, the circuitry may be further configured to modify the shared information received from the one or more other wireless device and send the modified shared information to another wireless device which is different from the one or more other wireless device. This aspect enables the shared information to be transferred by direct wireless communication between wireless devices. This may expand the range of sharing the specific information.

According to a second aspect, a network system including a first wireless device and a second wireless device is provided. The network system is configured to allow for direct wireless communication with the first wireless connection device. In the network system of the second aspect, the first wireless connection device may comprise circuitry configured to receive information from one or more devices connected with the first wireless device, select specific information out of information received from the one or more devices, generate shared information using the selected specific information as selected by the circuitry and send the shared information to the second wireless connection device by direct wireless communication. The network system of this aspect enables specific information to be shared between one or more wireless devices without depending on any external network infrastructure. Any of the various aspects described above with regard to the wireless device of the first aspect is also applicable to the network system of the second aspect.

According to a third aspect, a control method of a wireless device is provided. The control method of the wireless device of the third aspect may comprise receiving information from one or more devices connected with the wireless device, selecting specific information out of information received from the one or more devices; generating shared information using the specific information; establishing direct wireless connection with the one or more other wireless devices; and sending directly the shared information to the one or more wireless connection devices by the established wireless connection. The control method of the wireless device of this aspect enables specific information to be shared between specified LANs without depending on any external network infrastructure. Any of the various aspects described above with regard to the wireless device of the first aspect is also applicable to the control method of the wireless device of the third aspect.

What is claimed is:

1. A wireless device comprising:
circuitry configured to:
receive information from one or more sensor devices connected with the wireless device;
select specific information out of the information received from the one or more sensor devices;
identify a type of a sensor device out of the one or more sensor devices which is the information source of the information as received by the circuitry;
determine a coverage area within which shared information reaches based on the identified type of the sensor device being the information source;
generate the shared information using the specific information as selected by the circuitry, the generated shared information including the determined coverage area; and
send the shared information to one or more other wireless devices by direct wireless communication such that the shared information reaches within the determined coverage area.

2. The wireless device according to claim 1,
wherein the coverage area corresponding to the type of the sensor device being the information source is specified by referring to a table stored in the circuitry.

3. The wireless device according to claim 1, wherein the wireless device is included in a movable wireless device having an internal power supply.

4. The wireless device according to claim 3,
wherein the circuitry included in the movable wireless device does not send the shared information to the one or more other wireless devices, when a current location of the movable wireless device is included in a predetermined specific location.

5. The wireless device according to claim 1,
wherein the specific information includes information received from at least one of a weather sensor, an earthquake sensor, a security sensor and a fire sensor.

6. The wireless device according to claim 1, wherein the circuitry is further configured to select the specific information out of the information received from the one or more sensor devices via the Internet.

7. The wireless device according to claim 1, wherein the circuitry is configured to modify the shared information and send the modified shared information to another wireless device, which is different from the one or more other wireless devices.

8. The wireless device according to claim 7, wherein the wireless device is included in a movable wireless device having an internal power supply, wherein the circuitry included in the movable wireless device does not send the modified shared information to the one or more other wireless devices, when a current location of the movable wireless device is included in a predetermined specific location.

9. The wireless device according to claim 1, wherein
the wireless device is included in a movable wireless device having an internal power supply, wherein
the circuitry included in the movable wireless device does not send the shared information, which is received via an information sharing interface from the one or more other wireless devices, to another specified wireless device that is different from the one or more other wireless devices via the information sharing interface, when a current location of the movable wireless device is included in a predetermined specific location.

10. The wireless device according to claim 1, wherein
the circuitry is configured to further directly send a shared SSID (service set identifier) with the shared information to the one or more other wireless devices, wherein the shared SSID allows the one or more other wireless devices to receive the shared information.

11. A network system comprising:
a first wireless device; and
a second wireless device,
wherein the first wireless device includes:
circuitry configured to:
receive information from one or more sensor devices connected with the first wireless device;
select specific information out of information received from the one or more sensor devices;
identify a type of a sensor device out of the one or more sensor devices which is the information source of the information as received by the circuitry;
determine a coverage area within which shared information reaches based on the identified type of the sensor device being the information source;
generate the shared information using the specific information as selected by the circuitry, the generated shared information including the determined coverage area;
send the shared information to the second wireless device by direct wireless communication such that the shared information reaches within the determined coverage area.

12. A control method of a wireless device, comprising:
receiving information from one or more sensor devices connected with the wireless device;
selecting specific information out of the information received from the one or more sensor devices;
identifying a type of a sensor device out of the one or more sensor devices which is the information source of the information as received by the circuitry;
determining a coverage area within which shared information reaches based on the identified type of the sensor device being the information source;
generating the shared information using the specific information, the generated shared information including the determined coverage area;
establishing direct wireless connection with one or more other wireless devices; and
sending directly the shared information to the one or more other wireless devices by the established wireless connection such that the shared information reaches within the determined coverage area.

13. The control method according to claim 12,
wherein the identifying identifies the coverage area corresponding to the type of the sensor device which is the information source by referring to a table.

14. The control method according to claim 12,
wherein the coverage area is specified with respect to each of the specific information.

15. The control method of claim 12, wherein
the wireless device is included in a movable wireless device having an internal power supply, and
the method further comprising:
not sending the shared information to the one or more other wireless devices, when a current location of the movable wireless device is included in a predetermined specific location.

16. The control method of claim 12, wherein
the wireless device is included in a movable wireless device having an internal power supply, and
the method further comprising:
not sending the shared information, which is received via an information sharing interface from the one or more other wireless devices, to another specified wireless device that is different from the one or more other wireless devices via the information sharing interface, when a current location of the movable wireless device is included in a predetermined specific location.

* * * * *